April 1, 1930.   W. R. AUSTIN ET AL   1,752,936
PROCESS FOR THE MANUFACTURE OF ANHYDROUS ALUMINUM CHLORIDE
Filed July 7, 1923
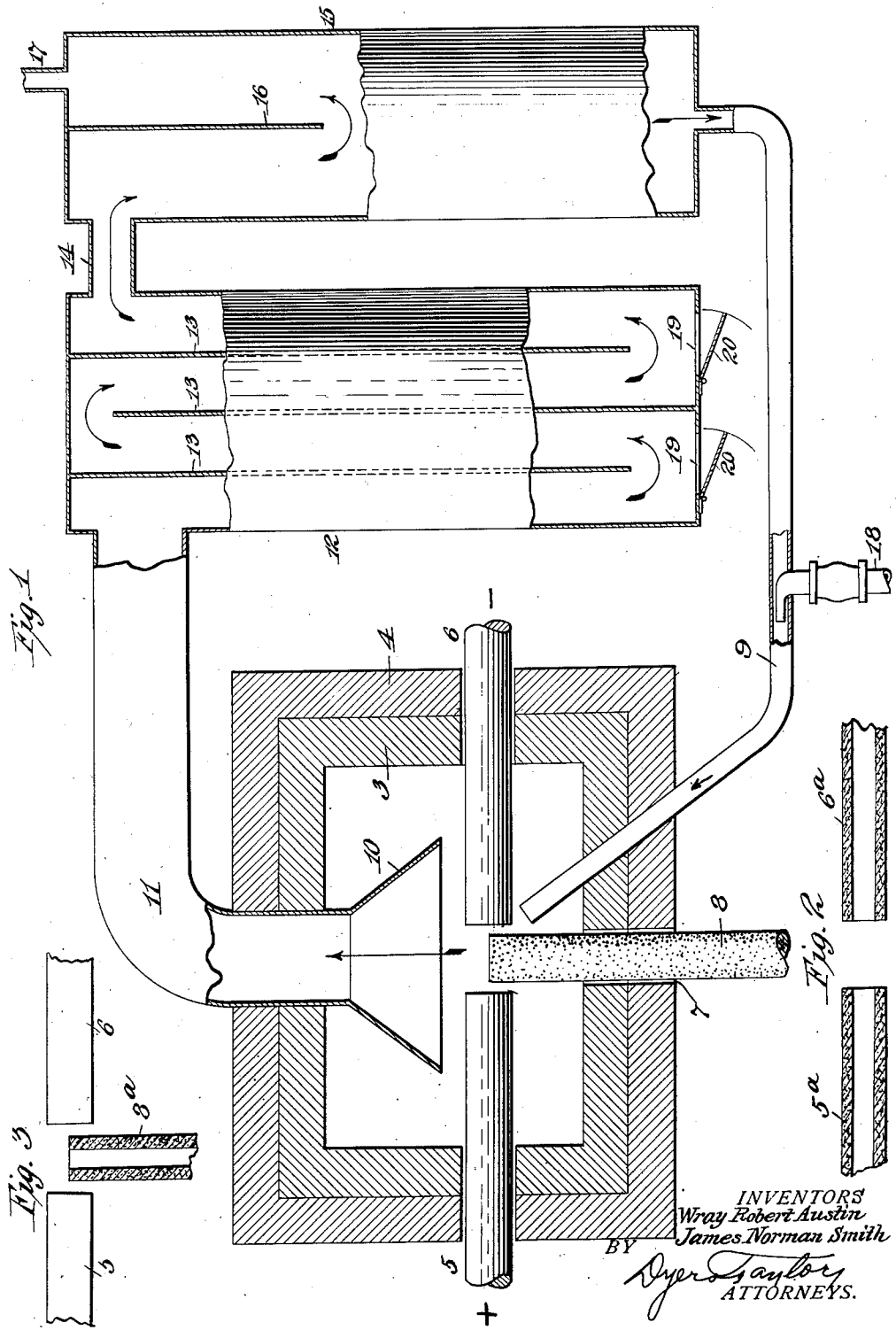

Patented Apr. 1, 1930

1,752,936

UNITED STATES PATENT OFFICE

WRAY ROBERT AUSTIN AND JAMES NORMAN SMITH, OF TORONTO, ONTARIO, CANADA, ASSIGNORS TO FARLEY G. CLARK, OF TORONTO, CANADA

PROCESS FOR THE MANUFACTURE OF ANHYDROUS ALUMINUM CHLORIDE

Application filed July 7, 1923. Serial No. 649,999.

The invention relates to the production of anhydrous aluminum chloride, and has for its objects to produce such a compound at low cost.

A further object is to produce such a compound at high temperatures, approximately the volatilization temperature of the reducing agent.

A further object is to protect the walls of the apparatus in which the process is carried out, from disintegration at the high temperature employed in carrying out the process.

A further object is to reduce heat losses due to radiation.

A further object is to control the rapidity of the reaction.

These and further objects will more fully appear in the following specification and accompanying drawings considered together or separately.

The invention is illustrated in the accompanying drawings in which like parts in all of the several figures are designated by corresponding characters of reference, and in which Fig. 1 is a longitudinal sectional view of an apparatus for carrying out the process.

Fig. 2 is a diagrammatic view of a modification, and

Fig. 3 is a similar view of a further modification.

The embodiment of the invention illustrated in Fig. 1 comprises a furnace having walls 3 of a suitable refractory material, and preferably surrounded by a sheathing or lagging 4 of insulating material.

Piercing the side walls of the furnace is a plurality of electrodes 5 and 6 preferably of carbon or graphite. The electrodes are preferably arranged in axially alined pairs, one of each pair being positive and the other being negative. The electrodes may be two in number, as shown, or any desired number may be employed. The electrodes are adjustable toward and away from the center, as is common and the current may be regulated as desired.

As shown, and as above described, direct current is employed for producing the arc or arcs, but the invention is not limited to such use. The current may be either direct or alternating, and it may be of any voltage, amperage, or frequency necessary or desirable to maintain the arc.

In the bottom of the furnace is an opening 7 through which the reacting material enters. In the embodiment of the invention illustrated, the material is shown as a cylindrical column or pencil 8 which is fed upward, by any suitable means, whereby, as it is consumed, its upper end is maintained in position in the arc between the electrodes.

A conduit 9 for conveying chlorine to the reaction enters the bottom of the furnace, and with its discharge nozzle as near the arc as possible. The conduit is provided with a valve by means of which the supply of chlorine may be regulated.

A conical hood 10 is disposed within the furnace with its mouth above and in proximity to the arc, and is provided with a flue 11 which passes through to top of the furnace and leads to a condenser 12 provided with baffle plates 13 for conducting the products of the reaction through the condenser in a circuitous path, and with a gas escape pipe 14. The condenser illustrated shows three baffle plates, but it is to be understood that the dimensions of the condenser may be extended or a number of them in series may be employed.

A conduit 14 connects the condenser, or the last of the series, to a gas chamber 15 having a baffle plate 16 extending from the top, part way to the bottom thereof. The conduit 14 enters the chamber at one side of the baffle, and an exhaust pipe 17 leads from the chamber at the other side of the baffle.

The chlorine conduit 9 communicates with the bottom of the chamber 15, and a valved pipe 18 supplied from a source of chlorine (not shown) enters the conduit 9.

The bottom of the condenser, or condensers is or are provided with openings 19 for the removal of anhydrous aluminum chloride, and doors 20 normally close the openings.

The reacting material comprises alumina, or any aluminous, or aluminum bearing material such as bauxite, clay, etc., and carbon, in the form of coke, charcoal, graphite, etc. The proportions of the ingredients of the feed material should be those at which the reduction will be properly and rapidly accomplished. A mixture of 100 parts, by weight, of the alumina content, and 40 parts, by weight, of carbon has been found to give good results.

The material should be finely ground, intimately mixed, and thoroughly dried. The mixture is then fed into the furnace and preferably into the arc maintained between the electrodes, while at the same time a stream of chlorine gas is directed into the furnace, preferably in as close proximity to the arc and charge as possible.

In the embodiment of the invention illustrated in Fig. 1, the aluminic material and carbon ground, dried and mixed as before, are mixed with a suitable binder, such for example, as tar, pitch, oil, molasses, etc. and then compressed and baked to form a column or pencil of any desired size or shape.

Instead of feeding a solid column of material into the furnace, the said mixture may be directed in its powdered form into the arc, together with the chlorine necessary to the reaction, in any suitable manner. In Fig. 2 both of the electrodes $5^a$ and $6^a$ are tubular, and the pulverized reacting materials may be fed through one electrode, and the chlorine may be fed through the other, or the said electrodes $5^a$ and $6^a$ may be composed of the reacting materials and one or both of them may be tubular to permit of the entrance of the chlorine.

In Fig. 3 the arrangement of the electrodes 5 and 6 and the column $8^a$ of reacting material is the same as in Fig. 1, but the column $8^a$ is tubular for the admission of the chlorine.

In the arrangement illustrated in Fig. 2, both tubular electrodes may convey the reacting material, and the chlorine may enter as in Fig. 1.

The operation of the process as carried out in the apparatus illustrated in Fig. 1, is as follows:—

Current is passed through the electrodes 5 and 6 and the arc is formed between them. The active surfaces of the electrodes are spaced apart a sufficient distance to permit of the upper end of the pencil 8 of reacting material to enter the spaces between the electrodes and be in the arc. The nozzle or outlet of the pipe 9 is preferably as near the arc and the upper surface of the pencil 8 as possible.

Chlorine gas under pressure is now directed through the pipes 18 and 9 into the furnace, the discharge end of the pipe 9 being preferably in proximity to the point at which the reaction is carried out that is at or near the zone of greatest heat.

At the preferred temperature, approximately 3,600° C., volatilization of the carbon occurs, and its affinity for alumina and chlorine is greatly increased, and the chemical presentation is enhanced. The difficulty encountered in prior devices, of heating the mass of alumina and carbon, is entirely overcome in the present case by the high temperature employed, and the intensive local heating resorted to and by the fact that the material to be acted on is continuously fed into the zone of highest temperature and immediately acted on by the heat.

The reaction zone is surrounded by an atmosphere of carbon monoxide and anhydrous aluminum chloride vapor together with any chlorine in excess of that utilized in the reaction, which atmosphere, because of the low heat conductivity of the gaseous mixture, will prevent the intense heat of the arc from reaching the walls of the furnace, and the temperature of the walls will be very much less than that of the temperature at which the reaction is carried out. Because of the fact that the temperature of the furnace walls is low, a wider range of materials with which to build them is available, the furnace may be built more cheaply than if the walls were subjected to a temperature even approximating that at which the reaction occurs, heat losses due to radiation are reduced to a minimum, and the life of the furnace is prolonged indefinitely. With a furnace of comparatively small area the walls may be at as low a temperature as 100° C. when the reaction is carried out at a temperature of 3,600° C.

The heat of the arc, and of the reaction, is localized because of the atmosphere of carbon monoxide, anhydrous aluminum chloride and chlorine gas, and by the fact that most of the heat is carried off by the hood 10 and flue 11.

The products of the reaction are gathered into the gas collecting hood 10 and are conveyed by the flue 11 into the condenser 12. The baffles 13 retard the passage of the gas, and aluminum chloride is condensed and falls to the bottom of the condenser.

Carbon monoxide with uncondensed chlorine gas will escape through the pipe 14 and pass into the chamber 15 from whence carbon monoxide fairly free from chlorine gas will escape from the pipe 17. The greater part of the chlorine gas will be carried from the chamber 15 into the conduit 9 by carbon monoxide and the mixture of gases will be directed back into the reacting zone with the gas from the pipe 18, the latter gas acting as an injecting means to boost the circulation of the gas.

The aluminum chloride may be removed from the condenser through the openings 19, and the carbon monoxide may be used for melting the aluminum chloride or for any other purpose.

The operation of the process is the same when the reacting substances in powdered form are employed, and in all cases the rapidity of the reaction may be closely controlled by the amount of current used and the rate of feed of the reacting materials.

Instead of making a simple mixture of ground, dried and thoroughly mixed material to be fed into the furnace, the said materials may be mixed with a binder, such as above described, and then baked in any suitable manner to expel moisture and hydrocarbons and form a clinker. The clinker may be then ground or pulverized to any desired size, and fed into the arc as before. By "aluminic material" herein, is meant a material carrying, containing or comprising aluminum or any of its compounds.

In accordance with the provisions of the patent statutes the principle of the invention has been described, together with the apparatus which is now considered to represent the best embodiment thereof, but it is desired to have it understood that the apparatus shown is merely illustrative, and that the invention may be carried out in other ways.

The invention having been described, what is claimed and desired to be secured by Letters Patent is:

1. The process of making anhydrous aluminum chloride, which comprises the reduction of aluminic material to aluminum by carbon and the chlorination of the reduced aluminum by heating in a furnace at the approximate temperature of an electric arc.

2. The process of making anhydrous aluminum chloride, which comprises heating aluminic material, carbon and chlorine, as a single operation, at the approximate temperature of an electric arc.

3. The process of making anhydrous aluminum chloride, which comprises heating in a furnace a charge comprising an aluminic material, carbon and chlorine, there being a localized zone within the furnace heated to the volatilization temperature of the carbon and into which the charge is fed.

4. The process of making anhydrous aluminum chloride, which comprises heating in a furnace a charge comprising an aluminic material, carbon and chlorine, there being a localized zone within the furnace heated to the volatilization temperature of the carbon and into which the charge is fed, there being an excess of chlorine over that required in the reaction.

5. The process of making anhydrous aluminum chloride, which comprises heating in a furnace a charge containing an aluminic material, carbon, and chlorine, there being a localized zone within the furnace heated to a temperature of approximately 3,600° C. into which the charge is directed.

6. The process of making anhydrous aluminum chloride, which comprises heating in a furnace a charge comprising an aluminic material, carbon and chlorine, there being a zone within the furnace heated to the volatilization temperature of the carbon into which the charge is directed, and localizing the heat to such zone.

7. The process of making anhydrous aluminum chloride, which comprises heating a charge comprising an aluminic material, carbon and chlorine to the volatilization temperature of the carbon, and localizing the heat to a restricted zone by an atmosphere of gas having low heat conductivity.

8. The process of making anhydrous aluminum chloride, which comprises heating a charge comprising an aluminic material, carbon and chlorine to the volatilization temperature of the carbon, and localizing the heat to a restricted zone by an atmosphere of carbon monoxide and anhydrous aluminum chloride.

9. The process of making anhydrous aluminum chloride, which comprises forming an electric arc, introducing a charge comprising an aluminic material, carbon, and chlorine into the arc, and removing the products of the reaction.

10. The process of making anhydrous aluminum chloride, which comprises forming an electric arc, introducing a charge comprising an aluminic material, carbon, and chlorine into the arc, and removing the products of the reaction, the means for removing the products being adjacent the arc.

11. The process of making anhydrous aluminum chloride, which comprises forming an electric arc, introducing a charge comprising an aluminic material, carbon, and chlorine into the arc, and removing the products of the reaction, the means for removing the products being adjacent and above the arc.

12. The process of making anhydrous aluminum chloride, which comprises forming an electric arc, introducing a charge comprising an aluminic material, carbon, and chlorine into the arc, the chlorine being in excess of that required in the reaction, and removing the products of the reaction.

13. The process of making anhydrous aluminum chloride, which comprises forming an electric arc, introducing a charge comprising an aluminic material, carbon, and chlorine into the arc, removing the products of the reaction from the heat of the arc and condensing the aluminum chloride from the products.

14. The process of making anhydrous aluminum chloride, which comprises forming an electric arc, introducing a charge comprising an aluminic material, carbon, and chlorine into the arc, the chlorine being in excess of that required in the reaction, removing the products of the reaction from the heat of the arc and condensing the aluminum chloride from the products.

15. The process of making anhydrous aluminum chloride, which comprises forming an arc in a furnace by the passage of an electric cement between horizontally disposed electrodes, directing a charge of an aluminic material and carbon and chlorine into the zone of the arc, the chlorine being in excess of that required in the reaction, the excess of chlorine filling the furnace and confining the heat of the arc to a comparatively small zone around the arc, the gases of the reaction being collected in proximity to and above the arc whereby the gases will be removed from the furnace, said gases being condensed to separate the aluminum chloride from the excess chlorine and carbon monoxide.

16. The process of making anhydrous aluminum chloride, which comprises forming electrodes of a material comprising an aluminic material and carbon, passing a current of electricity between the electrodes to form an arc, admitting chlorine to the heat of the arc whereby the heat of the arc acting on the electrodes and the chlorine will form aluminum chloride.

This specification signed and witnessed this 5th day of July, 1923.

WRAY ROBERT AUSTIN.
JAMES NORMAN SMITH.